US 011885970 B2

United States Patent
Wright et al.

(10) Patent No.: US 11,885,970 B2
(45) Date of Patent: Jan. 30, 2024

(54) BLUE LIGHT REDUCTION

(71) Applicant: Nokia Technologies Oy, Espoo (FI)

(72) Inventors: Christopher Wright, London (GB); Matthew Lawrenson, Chesterfield, MO (US); David Duffy, Zurich (CH); Timothy Beard, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/764,473

(22) PCT Filed: Sep. 21, 2020

(86) PCT No.: PCT/EP2020/076206
§ 371 (c)(1),
(2) Date: Mar. 28, 2022

(87) PCT Pub. No.: WO2021/063712
PCT Pub. Date: Apr. 8, 2021

(65) Prior Publication Data
US 2022/0317456 A1    Oct. 6, 2022

(30) Foreign Application Priority Data
Oct. 3, 2019 (EP) .................... 19201324

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G09G 3/003* (2013.01);
(Continued)

(58) Field of Classification Search
CPC .............. G02B 27/0093; G02B 27/017; G02B 27/0172; G02B 2027/0132;
(Continued)

(56) References Cited

U.S. PATENT DOCUMENTS 6,624,828 B1 * 9/2003 Dresevic ................ G09G 5/005
715/765
2001/0043163 A1   11/2001 Waldern et al.
(Continued)

FOREIGN PATENT DOCUMENTS

EP         3537422 A2      9/2019
WO     2018/224671 A1    12/2018

OTHER PUBLICATIONS

Oh et al., "Analysis of Circadian Properties and Healthy Levels of Blue Light From Smartphones at Night", Scientific Reports, vol. 5.1, Jun. 18, 2015, pp. 1-6.
(Continued)

*Primary Examiner* — Nitin Patel
*Assistant Examiner* — Cory A Almeida
(74) *Attorney, Agent, or Firm* — ALSTON & BIRD LLP (57) ABSTRACT

According to various, but not necessarily all, embodiments there is provided an apparatus comprising means for binocularly displaying visual content as a first image directed towards a first eye of a user and as a second image directed towards a second eye of the user. The first image comprises a first area in which a blue spectral component of the visual content is reduced as compared to a corresponding first area of the second image. The second image comprises a second, different area in which a blue spectral component of the visual content is reduced as compared to a corresponding second area of the first image.

20 Claims, 5 Drawing Sheets

(51) Int. Cl.
*G09G 3/00* (2006.01)
*G09G 5/14* (2006.01)

(52) U.S. Cl.
CPC ....... *G09G 5/14* (2013.01); *G02B 2027/0134* (2013.01); *G09G 2320/0666* (2013.01); *G09G 2320/0686* (2013.01)

(58) Field of Classification Search
CPC .. G02B 2027/0134; G09G 3/003; G09G 5/14; G09G 2320/0613; G09G 2320/0666; G09G 2320/0686; G09G 2380/08
See application file for complete search history.

(56) References Cited

U.S. PATENT DOCUMENTS

| | | | |
|---|---|---|---|
| 2013/0127935 A1 | 5/2013 | Wan et al. | |
| 2014/0285429 A1* | 9/2014 | Simmons | G02B 27/0179 359/259 |
| 2014/0300857 A1 | 10/2014 | Cohen-Tannoudji et al. | |
| 2014/0320806 A1 | 10/2014 | Cohen-tannoudji et al. | |
| 2015/0002809 A1 | 1/2015 | Cohen-tannoudji et al. | |
| 2015/0334808 A1 | 11/2015 | Hack et al. | |
| 2016/0140913 A1* | 5/2016 | Aragane | G09G 5/02 345/77 |
| 2017/0274221 A1 | 9/2017 | Barrau et al. | |
| 2018/0074322 A1 | 3/2018 | Rousseau et al. | |
| 2018/0077767 A1 | 3/2018 | Soler et al. | |
| 2018/0130446 A1 | 5/2018 | Guest et al. | |
| 2018/0137598 A1* | 5/2018 | Spitzer | G06F 3/013 |
| 2019/0244557 A1* | 8/2019 | Deering | G09G 3/32 |

OTHER PUBLICATIONS

"Red Hydrogen One: Android Phone with Light Field Display Released in the U.S.", Lightfield, Retrieved on Mar. 7, 2022, Webpage available at : http://lightfield-forum.com/2018/11/red-hydrogen-one-android-phone-with-light-field-display-released-in-the-u-s/.

"Light Field Displays are Coming", Displaydaily, Mar. 7, 2022, Webpage available at : https://www.displaydaily.com/article/display-daily/light-field-displays-are-coming.

"New evidence points to future iPhones with holographic displays", Bgr, Retrieved on Mar. 7, 2022, Webpage available at : https://bgr.com/2016/02/03/iphone-holographic-display-hover-gestures/.

Fattal et al.,"A multi-directional backlight for a wide-angle, glasses-free 3D display", Nature, vol. 495, Mar. 21, 2013, 5 Pages.

Fernandez et al., "Architecture of retinal projections to the central circadian pacemaker", Proceedings of the National Academy of Sciences, vol. 113, No. 21, May 9, 2016, pp. 6047-6052.

Khademagha et al.,"Why Directionality Is an Important Light Factor for Human Health to Consider in Lighting Design?", International Journal of Sustainable Lighting,vol. 35, Dec. 3-19, 2016, pp. 3-8.

"The Ultimate Guide to Blue Light Filters" Iristech, Retrieved on Mar. 7, 2022, Webpage available at : Iristech, https://iristech.co/blue-light-filters-ultimate-guide/#How_much_Blue_light_software_Blue_light_filters_block.

"Beat the computer blues with f.lux to get a better sleep", Thenationalnews, Retrieved on Mar. 7, 2022, Webpage available at : https://www.thenational.ae/business/beat-the-computer-blues-with-f-lux-to-get-a-better-sleep-1.2588.

Figueiro et al., "The Effects of Red and Blue Lights on Circadian Variations in Cortisol, Alpha Amylase, and Melatonin", International Journal of Endocrinology, vol. 2010, Mar. 2-Apr. 22, 2010, 10 Pages.

"Here's How Colours Really Affect Our Brain And Body, According to Science", Sciencealert, Retrieved on Mar. 7, 2022, Webpage available at : https://www.sciencealert.com/does-colour-really-affect-our-brain-and-body-a-professor-of-colour-science-explains.

"Watch: Apple developer controlling iphone X using eye-tracking" Gadgetsnow, Retrieved on Mar. 7, 2022, Webpage available at : https://www.gadgetsnow.com/mobiles/watch-apple-developer-controlling-iphone-x-using-eye-tracking/articleshow/64514593.cms.

"Did eye just do that? Microsoft brings gaze tracking to Windows 10", Theregister, Retrieved on Mar. 7, 2022, Webpage available at : https://www.theregister.co.uk/2017/08/02/microsoft_to_bring_eye_control_to_windows_10/.

"F.lux save your eyes but does it work?", Neowin, Retrieved on Mar. 8, 2022, Webpage available at : https://www.neowin.net/forum/topic/1131028-flux-save-your-eyes-but-does-it-work/.

Hannibal et al., "Melanopsin expressing human retinal ganglion cells: Subtypes, distribution, and intraretinal connectivity", Journal of Comparative Neurology, vol. 525, No. 8, Jun. 1, 2017, pp. 1934-1961.

"Intrinsically photosensitive retinal ganglion cell", Wikipedia, Retrieved on Mar. 8, 2022, Webpage available at : https://en.wikipedia.org/wiki/Intrinsically_photosensitive_retinal_ganglion_cell#Possible_role_in_conscious_sight.

Extended European Search Report received for corresponding European Patent Application No. 19201324.1, dated May 18, 2020, 8 pages.

International Search Report and Written Opinion received for corresponding Patent Cooperation Treaty Application No. PCT/EP2020/076206, dated Dec. 2, 2020, 11 pages.

Office action received for corresponding European Patent Application No. 19201324.1, dated Feb. 1, 2023, 5 pages.

* cited by examiner

BLUE LIGHT REDUCTION

RELATED APPLICATION

This application claims priority to PCT Application No. PCT/EP2020/076206 filed on Sep. 21, 2020, which claims priority to EP Application No. EP19201324.1, filed on Oct. 3, 2019, the contents of which are incorporated herein by reference in their entirety.

TECHNOLOGICAL FIELD

Embodiments of the present disclosure relate to blue light reduction. Some relate to blue light reduction for displayed visual content.

BACKGROUND

Light from a screen can disrupt natural circadian rhythms of a person, especially when used at night.

Blue light filters reduce loss of sleep and circadian disruption from screen time by filtering out the high energy part of the visual spectrum.

BRIEF SUMMARY

According to various, but not necessarily all, embodiments there is provided an apparatus comprising means for binocularly displaying visual content as a first image directed towards a first eye of a user and as a second image directed towards a second eye of the user. The first image comprises a first area in which a blue spectral component of the visual content is reduced as compared to a corresponding first area of the second image. The second image comprises a second, different area in which a blue spectral component of the visual content is reduced as compared to a corresponding second area of the first image.

According to various, but not necessarily all, embodiments there is provided a method comprising binocularly displaying visual content as a first image directed towards a first eye of a user and as a second image directed towards a second eye of the user. The first image comprises a first area in which a blue spectral component of the visual content is reduced as compared to a corresponding first area of the second image. The second image comprises a second, different area in which a blue spectral component of the visual content is reduced as compared to a corresponding second area of the first image.

According to various, but not necessarily all, embodiments there is provided a computer program that, when run on a computer, performs causing binocular display of visual content as a first image directed towards a first eye of a user and as a second image directed towards a second eye of the user. The first image comprises a first area in which a blue spectral component of the visual content is reduced as compared to a corresponding first area of the second image. The second image comprises a second, different area in which a blue spectral component of the visual content is reduced as compared to a corresponding second area of the first image.

The following portion of this 'Brief Summary' section, describes various features that may be features of any of the embodiments described in the foregoing portion of the 'Brief Summary' section. The description of a function should additionally be considered to also disclose any means suitable for performing that function.

A first spatially-discontinuous spectral filter can be applied to form the first image and a second, different, spatially-discontinuous spectral filter can be applied to form the second image.

The first filter and the second filter can be mirror-image filters.

The first area of the first image can be based on a target region of a retina of the first eye associated with a non-image-forming (NIF) function.

A predefined region of the retina can be selected, as the target region of the retina of the first eye, from among a plurality of different predefined regions of the retina based on a characteristic of the user. The plurality of different predefined regions of the retina are associated with different characteristics.

Data mapping intrinsically photosensitive retinal ganglion cell (ipRGC) locations in the retina of the first eye can be received. The target region of the retina of the first eye can be determined based on said data.

Values of parameters that parameterize the non-image-forming (NIF) function can be measured. Training data is formed based on pairing the values of the parameters with data indicative of images displayed during a defined period of time preceding the measurement of the values of the parameters. The training data enables a model of the retina of the first eye of the user to be produced. A definition of the target region of the retina of the first eye associated with the non-image-forming (NIF) function can be obtained from the model.

The first area of the first image can be based on a position of the first eye of the user with respect to the means for binocularly displaying the visual content.

The position of the first eye of the user can be determined based on analysis of an image captured by a camera with a known position relative to the means for binocularly displaying the visual content.

The reduction of the blue spectral component of the visual content in the first area of the first image can be controlled to prevent one or more of:
an instantaneous intensity of blue light exceeding a first threshold; or
a cumulative intensity of blue light in a given time period exceeding a second threshold.

User input to manually vary the first and/or second threshold can be received.

The first and/or second threshold can be varied in response to changes in environmental conditions and/or user actions.

The reduction of the blue spectral component of the visual content in the first area of the first image can be controlled to prevent one or more of:
a magnitude of the reduction exceeding a third threshold; or
a spatial contrast between the first area of the first image and an adjacent area of the first image exceeding a fourth threshold.

According to various, but not necessarily all, embodiments there is provided an apparatus comprising means for controlling binocular display of visual content of an image as a first image directed towards a first eye of a user and as a second image directed towards a second eye of the user, wherein the first image comprises a first area that is spatially-limited in which a higher-frequency spectral component of the visual content is reduced as compared to a corresponding first area of the second image, and wherein the second image comprises a second, different area that is spatially-limited and in which a higher-frequency spectral component of the visual content is reduced as compared to a corresponding second area of the first image.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
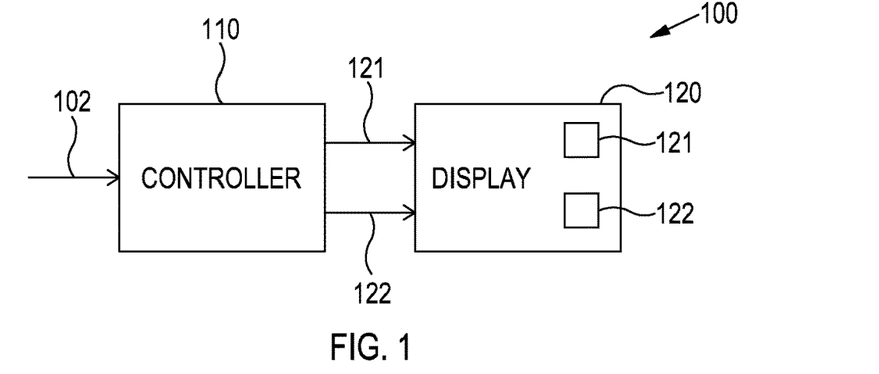
FIG. 1 shows an example of an apparatus described herein.

FIG. 1 illustrates an example of an apparatus 100. In this example, but not necessarily all examples, the apparatus 100 comprises a controller 110 and a display 120. The controller 110 is configured to receive an image 102 comprising visual content and to produce a first image 121 and a second image 122 that are displayed by the display 120. In other examples, the apparatus 100 can comprise only the controller 110.

Figure 2:
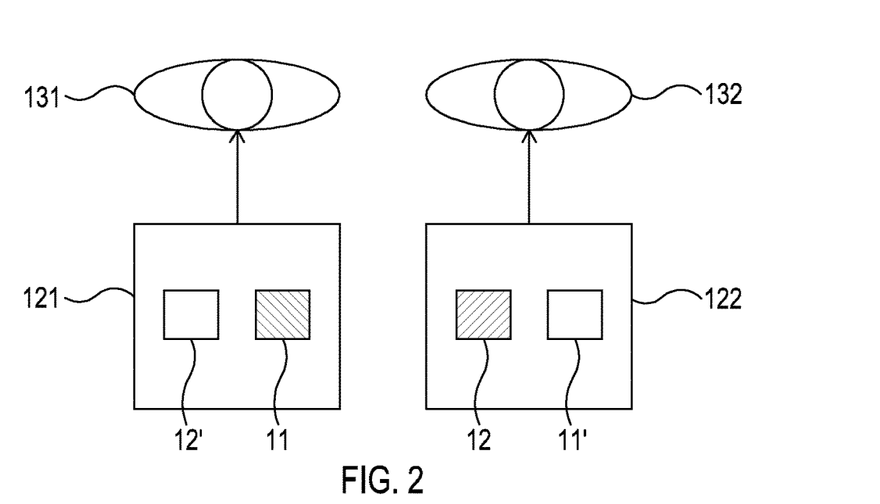
FIG. 2 shows another example of images described herein.

The display 120 is configured to display the first image 121 to a first eye 131 of a user, as illustrated in FIG. 2, and is configured to display the second image 122 to a second eye 132 of the user, as illustrated in FIG. 2.

The display 120 can comprise one or more display screens. In some examples, the display 120 can be provided by a head-mounted display apparatus. In other examples, the display 120 can be provided by a holographic display.

A display is an apparatus that controls what is perceived visually (viewed) by the user. The display 120 may be a visual display that selectively provides light to a user. Examples of visual displays include liquid crystal displays, direct retina projection displays, near eye displays, holographic displays etc. The display may be a head-mounted display (HMD), a hand-portable display or television display or some other display. A holographic display or other lightfield display can control the light emission angle of pixels in addition to intensity at each frequency.

The controller 110 is configured to control binocular display of visual content 102 as a first image 121 directed towards a first eye 131 of a user and as a second image 122 directed towards a second eye 132 of the user, as illustrated in FIG. 2.

"Binocular" refers to the use of two eyes at once. Binocular display of visual content 102 causes both the first and second images 121, 122 to be seen by the user at one time. The first image 121 is seen using the first eye 131 at a first time and the second image 122 is seen using the second eye 132 at the same first time. The second image 122 is not seen by the first eye 131 at the same first time. The first image 121 is not seen by the second eye 132 at the same first time. It is to be appreciated that both the first and second images 121, 122 being seen by the user at one time does not necessarily require that both the first and second images 121, 122 are displayed exactly simultaneously. Due to persistence of vision, the display of the first and second images 121, 122 can be offset in time and still be seen by the user at one time.

The first image 121 comprises a first image area 11 in which a higher-frequency spectral component of the visual content is reduced as compared to a corresponding first area 11' of the second image 122. The second image 122 comprises a second different area 12 in which a higher-frequency spectral component of the visual content is reduced compared to a corresponding second area 12' of the first image 121.

The higher-frequency spectral component reduced may be a relatively narrow band of frequencies. The higher-frequency spectral component may be a blue spectral component. The higher-frequency spectral component may be components with frequencies in the range 460 to 484 nm.

The controller 110 modifies the image 102 to produce the first image 121 so that the first area 11 is a spatially-limited area and modifies the image 102 so that the second area 12 is a spatially-limited area. The corresponding first area 11' and the corresponding second area 12' are similarly spatially-limited.

The first area 11 and the corresponding first area 11' have correspondence in that they comprise visual content that has the same features. The second area 12 and the corresponding second area 12' have correspondence in that they comprise visual content that has the same features.

In some examples, the first area 11 and the second area 12 do not have correspondence and the corresponding first area 11' and the corresponding second area 12' do not have correspondence.

The image 102 may be any suitable image. It may be a still image from a camera or a moving image such as video or a GUI object. Instead of the image 102, the visual content could be comprised in a stereo pair of images 102. In some examples, the image 102 is a pixelated image that defines, for each pixel, an independent intensity value for each color in a color palette.

Figure 3:
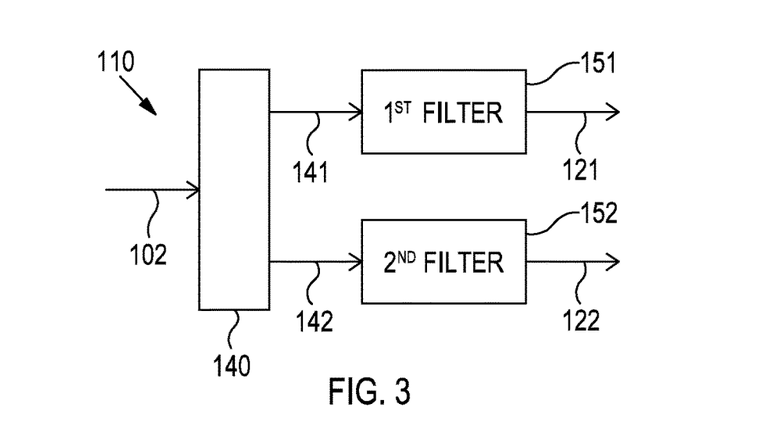
FIG. 3 shows another example of a controller described herein.

FIG. 3 illustrates an example of a controller 110. In this example, but not necessarily all examples, the controller 110 comprises a pre-processing block 140 that receives the image 102 and provides a first version 141 of the image 102 to a first filter 151 and provides a second version 142 of the image 102 to the second filter 152. The first filter 151 produces the first image 121 and the second filter produces the second image 122.

In some examples, the processing block 140 may direct the input image 102 to both the first filter 151 and the second filter 152. In this example, the first version 141 and the second version 142 of the input image 102 are the same. Where the visual content is comprised in a stereo pair of images 102, the first version 141 may be a first of the stereo pair and the second version 142 may be the second of the stereo pair. In other examples the input image 102 may be processed to produce the first version 141 and the second version 142. For example, in some, but not necessarily all examples, a horizontal spatial offset (parallax) may be applied between the first version 141 and the second version 142 of the image 102 to provide a stereoscopic effect.

The first filter 151 may be any suitable form of filter that transforms the image that is input to it to produce, as an output, the first image 121. The first filter 151 can be implemented in any suitable way either physically, electronically, digitally etc.

The second filter 152 may be any suitable form of filter that transforms the image that is input to it to produce, as an output, the second image 122. The second filter 152 can be implemented in any suitable way either physically, electronically, digitally etc.

Figure 4:
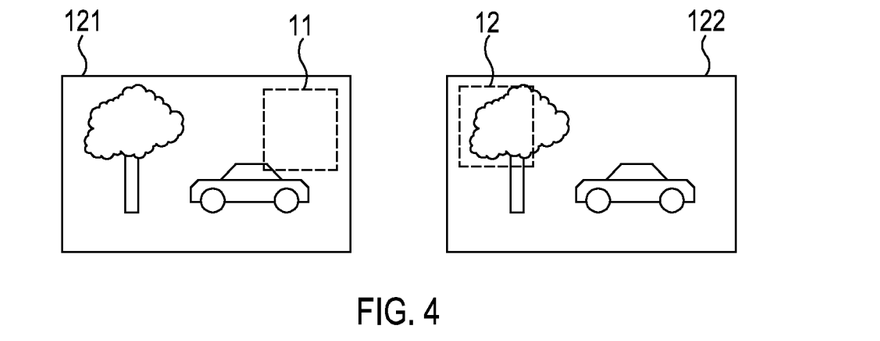
FIG. 4 shows another example of images described herein.

FIG. 4 illustrates an example in which visual content is directed towards the first eye 131 and the second eye 132 of the user. As can be appreciated from FIG. 4, the first image 121 is directed towards the first eye 131 of the user and the second image 122 is directed towards the second eye 132 of the user. It can be seen from FIG. 4 that the first image 121 and the second image 122 share the same visual content which is binocularly displayed to the user.

The first image 121 comprises a first area 11 in which a blue spectral component of the visual content is reduced as compared to a corresponding area 11' of the second image 122. The first area 11 of the first image 121 and the corresponding first area 11' of the second image 122 comprise the same visual features of the displayed visual content. That is, they relate to the same portion of the scene displayed.

The second image 122 comprises a second different area 12 in which a blue spectral component of the visual content is reduced compared to a corresponding second area 12' of the first image 121. The second area 12 of the second image 122 and the corresponding second area 12' of the first image 121 comprise the same visual features of the displayed visual content. That is, they relate to the same portion of the scene displayed.

Figure 5:
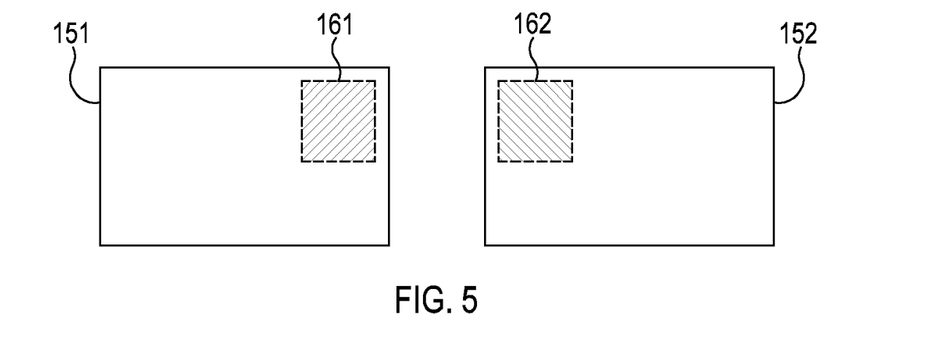
FIG. 5 shows another example of filters described herein.

FIG. 5 illustrates an example of a first filter 151 and a second filter 152 that can be used to produce the first image 121 and the second image 122 illustrated in FIG. 4. The first filter 151 has an attenuation portion 161 that is aligned with the first portion 11 of the first image 121. The attenuation portion 161 is configured to provide a frequency selective attenuation that reduces the higher frequency spectral components such as the blue light components. The first filter 151 does not have an attenuation portion aligned with the corresponding first portion 11' (not illustrated) of the first image 121.

The second filter 152 has an attenuation portion 162 that is aligned with the second portion 12 of the second image 122. The attenuation portion 162 is configured to provide a frequency selective attenuation that reduces the higher frequency spectral components such as the blue light components. The second filter 152 does not have an attenuation portion that is aligned with the corresponding second portion 12' (not illustrated) of the second image 122.

It will be appreciated from FIG. 5, that the first filter 151 and the second filter 152 are spatially-discontinuous in that the attenuation portions 161, 162 are spatially-limited. The controller 110 therefore applies a first spatially-discontinuous spectral filter 151 to the image 102 to produce the first image 121 and a second spatially-discontinuous spectral filter 152 to the image 102 to produce the second image 122.

It will be appreciated from FIG. 5 that the first filter and the second filter 151, 152 are different in that the attenuation portions 161, 162 are differently located within the filters 151, 152 so that they filter different portions of the image 102. In the example illustrated the attenuation portion 161 is located towards the upper right portion of the first filter 151 and the attenuation portion 162 is located to the upper left portion of the second filter 152.

In the example of FIG. 5, only a single attenuation portion 161, 162 is illustrated in each of the first and second filters 151, 152. However, each of the filters 151, 152 may comprise multiple attenuation portions 161, 162, for example, as illustrated in FIG. 6.

Figure 6:
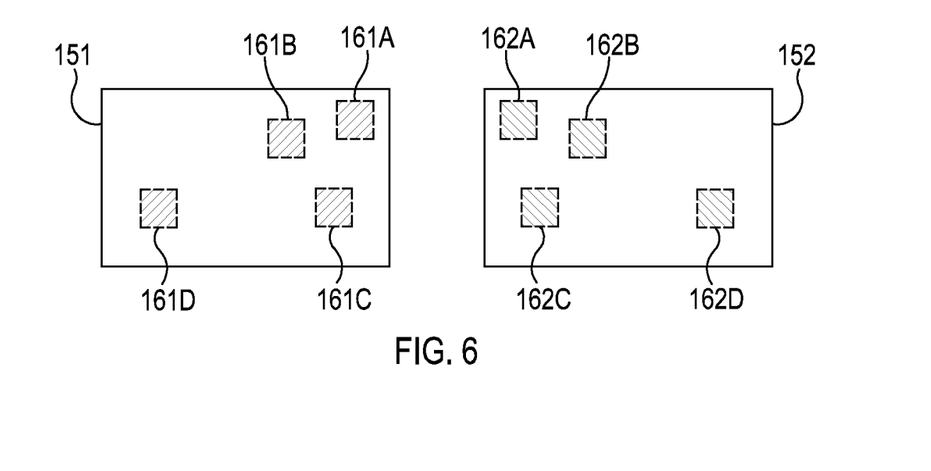
FIG. 6 shows another example of filters described herein.

In the example of FIG. 6, the first filter 151 comprises attenuation portions 161A, 161B, 161C, 161D and each of these attenuation portions 161 will produce a modified, spatially-limited, area in the first image 121 in which a blue spectral component of the visual content of the image is reduced. The second filter 152 comprises attenuation portions 162A, 162B, 162C, 162D and each of these attenuation portions 162 will produce a modified, spatially-limited, area in the second image 122 in which a blue spectral component of the visual content of the image is reduced.

The attenuation portions 161, 162 can in some but not necessarily all examples have a constant attenuation over a spatially-limited filter area.

Alternatively, the attenuation portions 161, 162 can in some but not necessarily all examples have a variable attenuation over a spatially-limited filter area. For example, the attenuation may be greater towards a central portion of the filter area and become less towards a peripheral region of the filter area. A boundary of the filter area can be faded or controlled to avoid boundary detection or other visual processes which may make the filter effect noticeable to the user. The gradient of fading from central portion to peripheral region can, in some examples, be controlled.

The locations of the attenuation portions 161A-D in the first filter 151 are dependent upon respective target regions of a retina of the first eye 131 of the user. The respective target regions of the retina of the first eye 131 of the user are associated with non-image-forming (NIF) functions.

The locations of the attenuation patterns 162A-D in the second filter 152 are dependent upon respective target regions of a retina of the second eye 132 of the user. The respective target regions of the retina of the first eye 131 of the user are associated with non-image-forming (NIF) functions.

The target regions comprise intrinsically photosensitive retinal ganglion cells (ipRGCs). The ipRGCs have functional roles which are non-image forming such as regulating the body's circadian functions, for example, circadian rhythm. The ipRGCs have an uneven distribution in the retina (the distribution is not necessarily as shown in FIG. 5). Different circadian functions have been found to be linked to distinct populations of ipRGCs, each population having a distribution in the retina. Light incident onto the respective populations of ipRGCs affects the respective circadian functions. The ipRGCs also have functional roles in, for example, mediating pupillary light response, regulating appetite, and regulating mood.

The uneven distribution of ipRGCs in the retina of the first eye 131 is spatially reflected (in the bisecting vertical axis between the eyes 131, 132) in the opposing second eye 132. Thus, at least some sections of an image which falls onto retinal regions containing ipRGCs in one eye will fall onto opposing regions in the other eye which will not contain ipRGCs. Therefore, in one eye, a full or augmented colour image section (not filtered by an attenuation portion 161, 162) can be displayed in one retinal region without affecting ipRGCs. In the other eye, an image section is displayed with a reduced colour palette (the section filtered by an attenuation portion 161, 162). The two images from the left and right eye 131, 132 are merged in the visual cortex of the user, and the superposition of the two images forms a complete image in which aesthetic changes (perceived colour palette) are reduced and circadian disruption and other effects of ipRGC light exposure are reduced.

That is, by reducing a blue spectral component of the visual content in a first area 11 of the first image 121 as compared to a corresponding first area 11' of the second image 122 and reducing a blue spectral component of the visual content in a second, different area 12 of the second image 122 as compared to a corresponding second area 12' of the first image 121, a substantially full color palette rendering of the visual content is produced by the superposition of the first and second images 121, 122 in the visual cortex and less ipRGCs will have been exposed to blue light.

The first filter 151 and the second filter 152 achieve the desired light exposure conditions for different retinal regions, avoiding unwanted biological effects, while maintaining viewer perception of the full image.

In at least some examples, the uneven distribution of ipRGCs in the retina of the first eye 131 defines a distribution of attenuation portions 161 for the first filter 151, and the uneven distribution of ipRGCs cells in the retina of the second eye 132 defines a distribution of attenuation portions 162 for the second filter 152. Consequently, in this example, the spatial pattern of attenuation portions 161 of the first filter 151, is a mirror image of the spatial pattern of attenuation portions 162 of the second filter 152.

Data that maps ipRGC locations in the retina of an eye can be used by the apparatus 100 to determine the target region of the retina of the eye.

It will be appreciated from FIG. 6 that the first filter 151 and the second filter 152 are mirror images of each other and that they have reflective symmetry in a substantially vertical central line separating the two filters that corresponds spatially to a substantially central line between the first eye 131 and the second eye 132 of the user.

In some examples, the filters 151, 152 are fixed. In other examples, the filters 151, 152 are adaptive, as will be described later. In other examples, the pair of first filter 151 and second filter 152 are selectable from a library of pairs of filters 151, 152. The selection of a particular pair of filters 151, 152 can, for example, be based upon a characteristic of the user. The controller 110 can therefore be configured to select, as the target region of the retina of the first eye, a predefined region of the retina from among a plurality of different predefined regions of the retina based on a characteristic of the user, the plurality of different predefined regions of the retina being associated with different characteristics.

The arrangement of the attenuation portions 161, 162 in their respective first and second filters 151, 152 is, for example, dependent upon the relative position of the eyes 131, 132 of the user and the display 120. The relative position of the eyes 131, 132 of the user determine the relative position of the target regions of the retinas of the eyes 131, 132 of the user associated with NIF functions.

In some examples, the relative position of eyes/target regions and display is primarily influenced by the eyes 131, 132 of the user. This could be a result of inherent characteristics of the user's eyes or because of movement of the user's eyes.

In other examples, the relative position of eyes/target regions and display is influenced by the location and/or orientation of the display 120.

In other examples the relative position of eyes/target regions and display is dependent upon both the eyes 131, 132 of the user and the position of the display 120.

In some examples, the relative position of the eyes 131, 132 and the display are considered to be fixed. In other examples, the relative position of the eyes 131, 132 and the display is dependent upon the characteristic of the user. In other examples, the relative position of the eyes 131, 132 and the display is based upon an estimate of the relative positioning. In other examples, the relative position of the eyes 131, 132 and the display is dependent upon sensing the relative position of the eyes 131, 132 of the user and/or the relative position of the display 120.

The relative positioning can be dependent upon a known or estimated distribution of ipRGCs in the retina of the user. The relative positioning can be dependent upon a known or estimated position of the user's eyes and gaze relative to the display 120.

Thus, the filtered areas 11 in the first image 121 can be located based on a relative position of the first eye 131 of the user with respect to the display 120 that displays the first image 121 to the first eye 131 of the user. Also, the filtered areas 12 in the second image 122 can be located based on a relative position of the second eye 132 of the user with respect to the display 120 that displays the second image 122 to the second eye 132 of the user.

Figure 7:
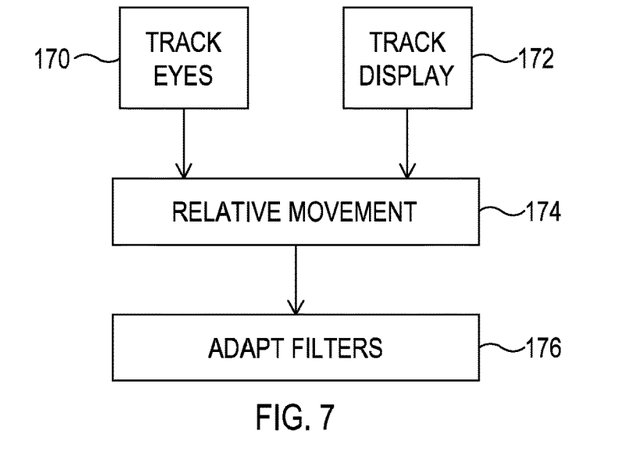
FIG. 7 shows another example of filter adaption described herein.

FIG. 7 illustrates an example in which the pair of filters 151, 152 are adapted dynamically based upon sensing relative movement of the eyes 131, 132 of the user and the display 120.

In FIG. 7, at block 170, the eyes 131, 132 of the user are tracked.

The position of the first eye 131 and the portion of the second eye 132 of the user can be determined based on computer vision analysis of an image (or images) captured by a camera with a known position relative to the display 120. The positions can be dependent upon a position of the user's head and a position of an eye 131, 132 relative to the head (a gaze direction). The position of the eye 131, 132 can therefore be defined by a location and/or an orientation.

At block 172, the movement of the display 120 is tracked. The location and orientation of the display 120 can be tracked using, for example, inertial sensors such as gyroscopes and accelerometers to track a position of the apparatus 100 (or display 120).

At block 174, a relative movement of the first eye 131 relative to the display 120 and a relative movement of the second eye 132 relative to the display 120 is determined. These results are then used at block 176 to adapt the first filter 151 and the second filter 152.

The algorithms used to determine the positions of the eyes 131, 132 relative to the display 120 determines, for each eye, a location and/or orientation. In addition to processing image data from the camera for tracking the user eyes 131, 132 using computer vision, the algorithm can additionally (or alternatively) process use data of the apparatus such as apparatus orientation, grip style etc If a holographic display 120 is used, then the algorithm can be used to calculate eye angle relative to the display 120, as this is an additional parameter that can be controlled by a holographic display or other light field display.

In some examples, the adaptation of the filters 151, 152 occurs within the controller 110. The block 174 that determines relative movement of the eyes and the display can in some examples occur within the controller 110 but can also occur elsewhere. In some examples, only the tracking of the eyes occurs. In other examples only the tracking of the display occurs. The tracking of the eyes 170 can, in some examples, at least partially be determined by the controller 110. The tracking of the display 120 170 can, in some examples, at least partially be determined by the controller 110.

Figure 8:
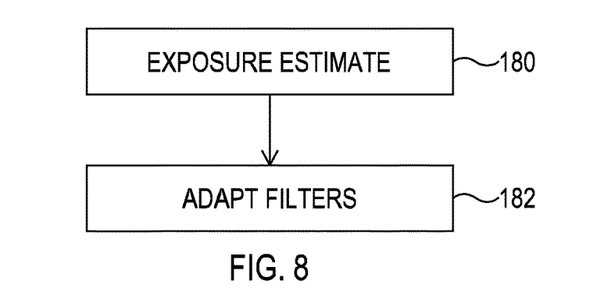
FIG. 8 shows another example of filter adaption described herein.

FIG. 8 illustrates another example of an adaptation of the filters 151, 152. In this example, at block 180, the exposure of target regions of the retinas of the eyes 131, 132 of the user associated with NIF functions to blue light is estimated and, as a consequence, the filters 151, 152 are adapted at block 182. In some, but not necessarily all examples, the filters 151, 152 are adapted at block 182 to prevent the target regions being exposed to blue light in a manner that would have an adverse effect on biological systems of the user regulated by the NIF functions such as, for example, circadian rhythm. For example, in some examples the attenuation applied by the filter 182 is controlled to an extent that is necessary to prevent the adverse biological effect but no more.

In one example, there is, at block 180, comparison of an estimate of the intensity of blue light at one or more target regions of the retinas of the eyes 131, 132 of the user associated with NIF functions relative to a threshold. The first and second filters 151, 152 are adapted to prevent the threshold being exceeded.

In some but not necessarily all examples, the estimate of the intensity of blue light is an estimate of the instantaneous intensity of blue light and the filters 151, 152 are adjusted to prevent it exceeding a first threshold.

In some but not necessarily all examples, the estimate of the intensity of blue light is an estimate of the cumulative intensity of blue light in a given time period and the filters 151, 152 are adjusted to prevent it exceeding a second threshold.

The apparatus 100 can be configured to receive user input to manually vary the threshold(s). The user could for example manually enter a night-time mode that specifies threshold settings. The threshold setting may be automatic or user adjustable.

The apparatus 100 can be configured to automatically vary the threshold(s). This automatic variation can, for example, be dependent upon or in response to environmental changes and/or user actions. For example, the threshold may vary in dependence upon the time of day with the thresholds being reduced as expected bedtime approaches. In addition, the thresholds may be dependent upon ambient light conditions such as the intensity of ambient blue light.

Figure 9:
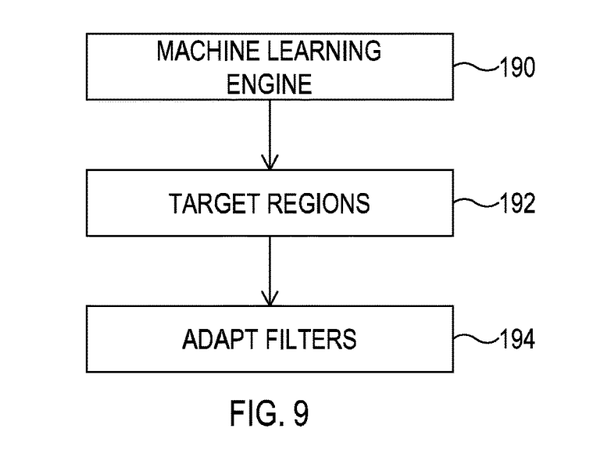
FIG. 9 shows another example of filter adaption described herein.

FIG. 9 illustrates an example in which the filters 151, 152 are adapted in dependence upon an estimate of ipRGC locations for a user. The ipRGC locations may be selected from a library of ipRGC locations based upon a characteristic of the user.

The library can be a database comprising the known or estimated locations of relevant ipRGC populations within a user's retina. It could identify retinal segments and presence or density of ipRGC populations This data can be predefined given knowledge of the average human retinal anatomy (for example, ipRGCs are found to have greater density in the nasal retina than in the temporal retina). Optionally, the location data may be refined by demographic or other categorization data.

The library may also record NIF function responsiveness to light exposure in different retinal regions where measurement of a response to an exposure is possible. This allows different exposure thresholds for different regions and/or different attenuation portions 161, 162 for different regions.

In the example illustrated in FIG. 9, a machine learning engine 190 is used to determine the target regions 192 of the retinas of the eyes 131, 132 of the user associated with NIF functions which are then used to adapt the filters 151, 152 at block 194.

To create the machine learning engine 190, values of parameters that parameterize a NIF function are measured.

For example, one NIF function is the regulation of the release of the hormone melatonin. Melatonin regulates the sleep-wake cycle. It can therefore be assessed in terms of the user's sleep. The user's sleep can be parameterized by, for example, movement and breathing patterns. Movement can be measured using inertial sensors. Breathing patterns can be measured using a microphone.

As previously mentioned, other NIF functions associated with ipRGCs include, for example, mediating pupillary light response, regulating appetite, and regulating mood. Eye-tracking systems can be used to monitor pupillary light response. Calorie counting applications, or other dietary monitoring applications, can be used to monitor appetite. Mood can be monitored via facial expression recognition, monitoring of physiological parameters such as heart rate, breathing rate, skin conductance etc., or by direct user input specifying their mood.

The machine learning engine 190 is created using training data which is formed based on pairing the values of the parameters that parameterize the NIF function with data indicative of images displayed during a defined period of time preceding the measurement of the values of the parameters, for example a period of 30 min to 1 hour before sleep.

The data indicative of the images displayed during the defined period of time can comprise an estimated blue light exposure pattern on the retina of the first and/or second eye 131, 132. The blue light exposure pattern can be estimated based on pre-processing of the images.

Forming the training data can comprise labelling the values of the parameters that parameterize the NIF function with blue light exposure patterns estimated for images in the period preceding the observation of these values.

The machine learning engine 190 can be trained, using the training data, to predict a blue light exposure pattern given the value of the parameters that followed.

Once the machine learning engine 190 has been trained, values of parameters which are indicative of a disruption to the NIF function can be provided to the machine learning engine 190 as inputs. The machine learning engine 190 provides, in response, an output blue light exposure pattern. This output blue light exposure pattern from the trained machine learning engine 190 comprises an estimate of a blue light exposure pattern that is predicted to trigger the disruption to the NIF function.

The estimate of the blue light exposure pattern that is predicted to trigger the disruption to the NIF function can be used to identify the target regions 192 of the retinas of the eyes 131, 132 of the user associated with NIF functions.

The pre-processing of images and training of the machine learning engine 190 can be performed locally, at the apparatus 100; remotely at one or more devices; or partially locally and partially remotely at the one or more devices.

In other examples data mapping ipRGC locations in the retina of the first and/or second eye 131, 132 can be received at the controller 110. For example, the data mapping ipRGC locations can be obtained by an optician who can provide the user with this data for the user to load to the controller 110.

The target regions 192 can be defined based on these ipRGC locations, for example to comprise these locations.

As has previously been described, it is possible to dynamically adapt the filters 151, 152.

However, it may also be desirable to control the extent to which that adaptation occurs.

Figure 10:
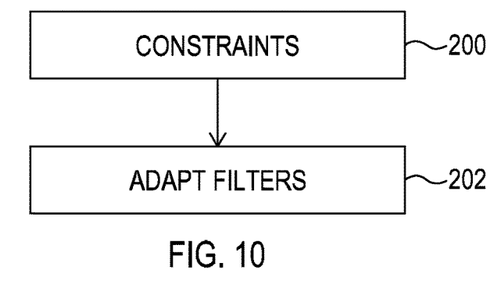
FIG. 10 shows another example of filter adaption described herein.

FIG. 10 illustrates an example in which filter adaptation is constrained. In this example, constraints defined at block 200 are used to control or constrain the adaptation of the filters 151, 152 at block 202.

In at least some examples, the constraints prevent or reduce the likelihood that the user notices or is irritated by the filtering of the image 102 by the first and second filters 151, 152.

In some but not necessarily all examples, the reduction of the blue spectral component of the visual content in the filtered areas 11 of the first image 121 is controlled to prevent a magnitude of the reduction exceeding an image-quality threshold.

In some but not necessarily all examples, the reduction of the blue spectral component of the visual content in the filtered areas 11 of the first image 121 is controlled to prevent a spatial contrast between the filtered areas 11 of the first image 121 and an adjacent unfiltered area of the first image 121 exceeding a different image-quality threshold. For example, the fading or gradient of fading of an attenuation portion 161, 162 in a filter 151, 152 can be controlled.

In some but not necessarily all examples, the reduction of the blue spectral component of the visual content in the filtered areas 11 of the first image 121 is controlled based on one or more aspects that can affect user perception such as, for example, media type, gaze location, ambient light level.

The constraints can also be adapted based user reaction or response to applied filters 151, 152.

It will be appreciated that at least some of the foregoing examples, enable the control of light exposure to ipRGC populations of the retina with minimal or no negative consequence to the aesthetic or functional properties of the user perceived image.

Figure 11:
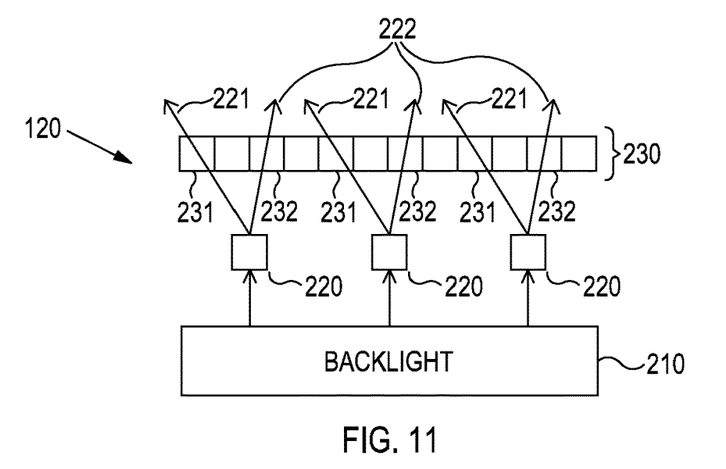
FIG. 11 shows another example of a holographic display described herein.

FIG. 11 illustrates an example of a holographic display 120 for binocularly displaying the visual content.

The holographic display 120 comprises an array of diffraction elements 220. The array of diffraction elements 220 is configured to guide a backlight 210 into at least a first set of principal directions 221 towards the first eye 131 of the user and a second, different set of principal directions 222 towards the second eye 132 of the user.

The holographic display 120 further comprises at least an array of first pixels 231 and an array of second, different pixels 232. The first pixels 231 are configured to display the first image 121. The second pixels 232 are configured to display the second image 122.

The array of first pixels 231 are arranged relative to the diffraction elements 220 such that the backlight 210 guided into the first set of principal directions 221 illuminates the first pixels 231. The array of second pixels 232 are arranged relative to the diffraction elements 220 such that the backlight 210 guided into the second set of principal directions 222 illuminates the second pixels 232.

Since, the position of the eyes 131, 132 of the user can change relative to the holographic display 120, the holographic display 120 can be controlled in dependence on the position of the user's eyes 131, 132 to direct the first image 121 to the first eye 131 and the second image 122 to the second eye 132.

In some examples, the array of diffraction elements 220 is configured to guide a backlight 210 into more than two sets of principal directions. These sets of principal directions may be fixed. The first set of principal directions 221 which are towards the first eye 131 of the user can be selected from the fixed sets of principal directions based on the position of the first eye 131 of the user relative to the holographic display 120. The second set of principal directions 222 which are towards the second eye 132 of the user can be selected from the fixed sets of principal directions based on the position of the second eye 132 of the user relative to the holographic display 120.

The array of first pixels 231 and the array of second pixels 232 can form part of a larger array of pixels 230.

The individual pixels of that larger array 230 that are determined to be first pixels 231 are determined based on the position of the first eye 131 of the user relative to the holographic display 120. The first pixels 231 comprise the pixels of that larger array 230 which are arranged relative to the diffraction elements 220 such that they are illuminated by backlight 210 guided into the selected first set of principal directions 221.

The individual pixels of that larger array 230 that are determined to be second pixels 232 are determined based on the position of the second eye 132 of the user relative to the holographic display 120. The second pixels 232 comprise the pixels of that larger array 230 which are arranged relative to the diffraction elements 220 such that they are illuminated by backlight 210 guided into the selected second set of principal directions 222.

Figure 12:
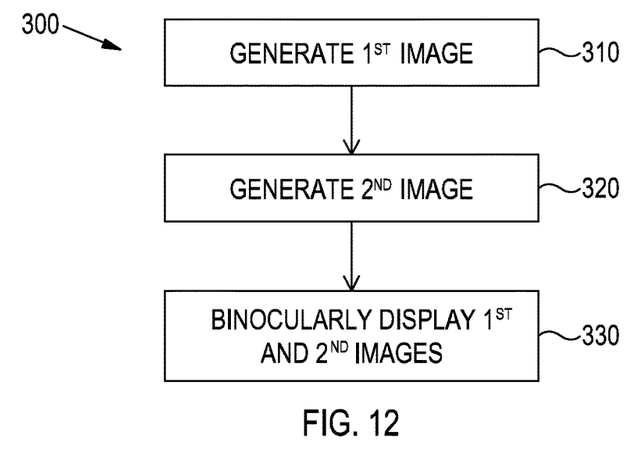
FIG. 12 shows another example of a method described herein.

FIG. 12 illustrates an example of a method 300. At block 310, the method 300 comprises generating a first image of the visual content. At block 320, the method 300 comprises generating a second image of the visual content. At block 330, the method 300 comprises binocularly displaying visual content as the first image directed towards a first eye of a user and as the second image directed towards a second eye of the user.

The first image comprises a first area in which a higher-frequency spectral component, such as a blue spectral component, of the visual content is reduced as compared to a corresponding first area of the second image.

The second image comprises a second, different area in which a higher-frequency spectral component, such as a blue spectral component, of the visual content is reduced as compared to a corresponding second area of the first image.

Figure 13:
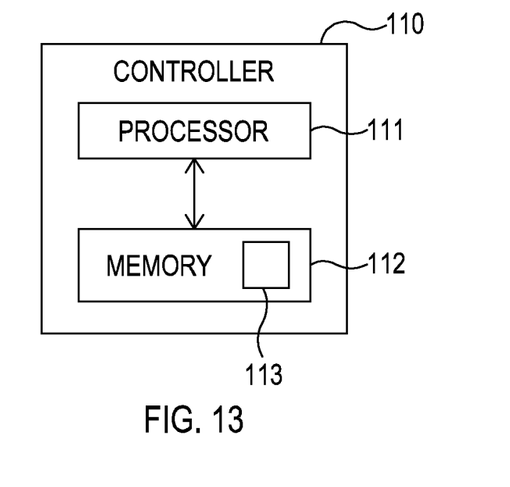
FIG. 13 shows another example of a controller described herein.

FIG. 13 illustrates an example of the controller 110. Implementation of the controller 110 may be as controller circuitry. The controller 110 may be implemented in hardware alone, have certain aspects in software including firmware alone or can be a combination of hardware and software (including firmware).

As illustrated in FIG. 13 the controller 110 may be implemented using instructions that enable hardware functionality, for example, by using executable instructions of a computer program 113 in a general-purpose or special-purpose processor 111 that may be stored on a computer readable storage medium (disk, memory etc) to be executed by such a processor 111.

The processor 111 is configured to read from and write to the memory 112. The processor 111 may also comprise an output interface via which data and/or commands are output by the processor 111 and an input interface via which data and/or commands are input to the processor 111.

The memory 112 stores a computer program 113 comprising computer program instructions (computer program code) that controls the operation of the apparatus 100 when loaded into the processor 111. The computer program instructions, of the computer program 113, provide the logic and routines that enables the apparatus to perform the methods, blocks, or functions illustrated in FIGS. 3, 7-10, 12. The processor 111 by reading the memory 112 is able to load and execute the computer program 113.

The apparatus 100 therefore comprises:

at least one processor 111; and at least one memory 112 including computer program code the at least one memory 112 and the computer program code configured to, with the at least one processor 111, cause the apparatus 100 at least to perform:

controlling binocular display of, and/or binocularly displaying, visual content as a first image directed towards a first eye of a user and as a second image directed towards a second eye of the user,     wherein the first image comprises a first area in which a blue spectral component of the visual content is reduced as compared to a corresponding first area of the second image, and     wherein the second image comprises a second, different area in which a blue spectral component of the visual content is reduced as compared to a corresponding second area of the first image.

Figure 14:
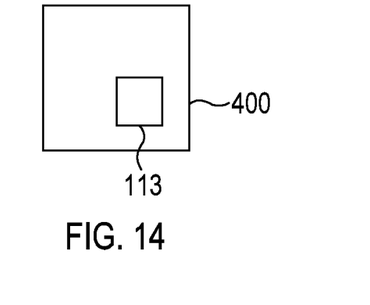
FIG. 14 shows another example of a delivery mechanism matter described herein.

As illustrated in FIG. 14, the computer program 113 may arrive at the apparatus 100 via any suitable delivery mechanism 400. The delivery mechanism 400 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 113. The delivery mechanism may be a signal configured to reliably transfer the computer program 113. The apparatus 100 may propagate or transmit the computer program 113 as a computer data signal.

Computer program instructions for causing an apparatus to perform at least the following or for performing at least the following:

causing binocular display of visual content as a first image directed towards a first eye of a user and as a second image directed towards a second eye of the user,     wherein the first image comprises a first area in which a blue spectral component of the visual content is reduced as compared to a corresponding first area of the second image, and     wherein the second image comprises a second, different area in which a blue spectral component of the visual content is reduced as compared to a corresponding second area of the first image.

In some examples causing the binocular display of the visual content as above comprises controlling binocular display of visual content of an image as a first image directed towards a first eye of a user and as a second image directed towards a second eye of the user.

The computer program instructions may be comprised in a computer program, a non-transitory computer readable medium, a computer program product, a machine readable medium. In some but not necessarily all examples, the computer program instructions may be distributed over more than one computer program.

Although the memory 112 is illustrated as a single component/circuitry it may be implemented as one or more separate components/circuitry some or all of which may be integrated/removable and/or may provide permanent/semi-permanent/dynamic/cached storage.

Although the processor 111 is illustrated as a single component/circuitry it may be implemented as one or more separate components/circuitry some or all of which may be integrated/removable. The processor 111 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 3, 7-10, 12 may represent steps in a method and/or sections of code in the computer program 113. The illustration of a particular order to the blocks does not necessarily imply that there is a required or preferred order for the blocks and the order and arrangement of the block may be varied. Furthermore, it may be possible for some blocks to be omitted.

The apparatus 100 of FIG. 1 may be or may comprise the controller 110 of FIG. 13 or may be or comprise any computer or machine capable of reading the computer program 113 from the delivery mechanism 400 of FIG. 14 and running that computer program 113.

It is to be appreciated that the apparatus 100 may comprise any suitable means for performing the functions hereinbefore described.

Consequently, in some examples, the apparatus 100 comprises means for:

controlling binocular display of, and/or binocularly displaying, visual content as a first image directed towards a first eye of a user and as a second image directed towards a second eye of the user, wherein the first image comprises a first area in which a blue spectral component of the visual content is reduced as compared to a corresponding first area of the second image, and wherein the second image comprises a second, different area in which a blue spectral component of the visual content is reduced as compared to a corresponding second area of the first image.

Where a structural feature has been described, it may be replaced by means for performing one or more of the functions of the structural feature whether that function or those functions are explicitly or implicitly described.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The algorithms hereinbefore described may be applied to achieve the following technical effects: reduced disruption of an intended color palette of visual content whilst reducing exposure of ipRGCs to blue light.

The above described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code,
      the at least one memory storing instructions that, when executed by the at least one processor, cause the apparatus at least to:

binocularly display visual content as a first image directed towards a first eye of a user and as a second image directed towards a second eye of the user;

wherein the first image comprises a first area in which a blue spectral component of the visual content is reduced as compared to a corresponding first area of the second image;

wherein the second image comprises a second area in which a blue spectral component of the visual content is reduced as compared to a corresponding second area of the first image; and wherein the first area and the second area are determined based on mirror-image filters applied to the first image and the second image.

2. An apparatus as claimed in claim 1 wherein the at least one memory and the instructions stored therein are configured to, with the at least one processor, further cause the apparatus to: apply a first spatially-discontinuous spectral filter to form the first image and apply a second, different, spatially-discontinuous spectral filter to form the second image.

3. An apparatus as claimed in claim 2 wherein the first filter and the second filter are mirror-image filters of each other.

4. An apparatus as claimed in claim 1 wherein the first area of the first image is based on a target region of a retina of the first eye, wherein the target region is associated with a non-image-forming (NIF) function.

5. An apparatus as claimed in claim 4 wherein the at least one memory and the instructions stored therein are configured to, with the at least one processor, further cause the apparatus to: based on a characteristic of the user, select, as the target region of the retina of the first eye, a region of the retina from among a plurality of different regions of the retina, wherein the plurality of different regions of the retina are associated with respective characteristics.

6. An apparatus as claimed in claim 4 wherein the at least one memory and the instructions stored therein are configured to, with the at least one processor, further cause the apparatus to: receive data mapping intrinsically photosensitive retinal ganglion cell (ipRGC) locations in the retina of the first eye; and based on said data, determine the target region of the retina of the first eye.

7. An apparatus as claimed in claim 4 wherein the at least one memory and the instructions stored therein are configured to, with the at least one processor, further cause the apparatus to:

measure values of parameters that parameterize the non-image-forming (NIF) function;

based on pairing the values of the parameters with data indicative of images displayed during a period of time preceding the measurement of the values of the parameters, form training data for creating a machine learning engine; and obtain from the machine learning engine the target region of the retina of the first eye associated with the non-image-forming (NIF) function.

8. An apparatus as claimed in claim 1 wherein the at least one memory and the instructions stored therein are configured to, with the at least one processor, further cause the apparatus to: based on a position of the first eye of the user with respect to a display configured to binocularly display the visual content, determine one or more properties of the first area of the first image.

9. An apparatus as claimed in claim 8 wherein the at least one memory and the instructions stored therein are configured to, with the at least one processor, further cause the apparatus to: based on analysis of an image captured by a camera with a known position relative to the display, determine the position of the first eye of the user.

10. An apparatus as claimed in claim 1 wherein the at least one memory and the instructions stored therein are configured to, with the at least one processor, further cause the apparatus to: control the reduction of the blue spectral component of the visual content in the first area of the first image to prevent one or more of:

an instantaneous intensity of blue light exceeding a first threshold; or a cumulative intensity of blue light in a time period exceeding a second threshold.

11. An apparatus as claimed in claim 10 wherein the at least one memory and the instructions stored therein are configured to, with the at least one processor, further cause the apparatus to: in response to receiving a user input, vary at least one of the first or second threshold.

12. An apparatus as claimed in claim 10 wherein the at least one memory and the instructions stored therein are configured to, with the at least one processor, further cause the apparatus to: in response to one or more changes in environmental conditions, vary at least one of the first or second threshold.

13. An apparatus as claimed in claim 10 wherein the at least one memory and the instructions stored therein are configured to, with the at least one processor, further cause the apparatus to: control the reduction of the blue spectral component of the visual content in the first area of the first image to prevent one or more of:

a magnitude of the reduction exceeding a third threshold; or a spatial contrast between the first area of the first image and an adjacent area of the first image exceeding a fourth threshold.

14. An apparatus as claimed in claim 1 further comprising a display comprising at least one display screen, wherein the display is configured to binocularly display the visual content.

15. A method comprising:

binocularly displaying visual content as a first image directed towards a first eye of a user and as a second image directed towards a second eye of the user, wherein the first image comprises a first area in which a blue spectral component of the visual content is reduced as compared to a corresponding first area of the second image, wherein the second image comprises a second area in which a blue spectral component of the visual content is reduced as compared to a corresponding second area of the first image; and wherein the first area and the second area are determined based on mirror-image filters applied to the first image and the second image.

16. A method as claimed in claim 15 wherein the first area of the first image is based on a target region of a retina of the first eye associated with a non-image-forming (NIF) function.

17. A method as claimed in claim 16 further comprising: based on a characteristic of the user, selecting, as the target region of the retina of the first eye, a region of the retina from among a plurality of different regions of the retina, wherein the plurality of different regions of the retina are associated with respective characteristics.

18. A method as claimed in claim 16 further comprising:
measuring values of parameters that parameterize the non-image-forming (NIF) function;
based on pairing the values of the parameters with data indicative of images displayed during a period of time preceding the measurement of the values of the parameters, forming training data for creating a machine learning engine; and
obtaining from the machine learning engine the target region of the retina of the first eye associated with the non-image-forming (NIF) function.

19. A non-transitory computer readable medium comprising program instructions stored thereon for causing an apparatus to perform at least the following:

binocularly display visual content as a first image directed towards a first eye of a user and as a second image directed towards a second eye of the user,
wherein the first image comprises a first area in which a blue spectral component of the visual content is reduced as compared to a corresponding first area of the second image,
wherein the second image comprises a second area in which a blue spectral component of the visual content is reduced as compared to a corresponding second area of the first image; and
wherein the first area and the second area are determined based on mirror-image filters applied to the first image and the second image.

20. The non-transitory computer readable medium as claimed in claim 19 wherein the first area of the first image is based on a target region of a retina of the first eye associated with a non-image-forming (NIF) function.

* * * * *